Patented Nov. 30, 1948

2,455,117

UNITED STATES PATENT OFFICE 2,455,117

NONCOMBUSTIBLE HYDRAULIC FLUID

Frank J. Glavis, Elkins Park, and Harry T. Neher, Bristol, Pa., assignors to Rohm & Haas Company, Philadelphia, Pa., a corporation of Delaware No Drawing. Application July 2, 1947, Serial No. 758,710

3 Claims. (Cl. 252—78)

This invention concerns hydraulic fluids and is directed to compositions which are useful for the transfer of pressure and power for operating mechanisms and for the dissipation of energy, as in shock absorbers.

There has recently arisen a need for hydraulic fluids which are useful in the cold and which are non-combustible. Hydraulic fluids which are useful and operative at relatively low temperatures have heretofore required the use of volatile organic solvents which are readily inflammable and have constituted a hazard under some conditions. Non-inflammable compositions heretofore proposed have been seriously deficient in one or more essential properties required for practical applications.

These properties include stability over long periods of storage and use, fluidity at low temperatures, consistencies suitable for proper operation of mechanisms, minimum changes in consistency with change in pressure or temperature, inertness toward the materials of construction of the systems in which used, lubricating action, antiwear properties, and capacity for preventing seizure of parts under load. The compositions, furthermore, must be free of any marked tendency to creep or seep through the normal clearances of operating mechanisms beyond that needed for normal lubrication of operating parts and should not form hard, insoluble films when left on exposed surfaces. The combination of properties which is required for such applications as hydraulically operated controls of aircraft is a most difficult one to find or obtain.

The present invention provides compositions of matter which possess a combination of properties satisfactory for a rather wide range of conditions which may be encountered in actual operation of aircraft, automotive vehicles of various types, and many kinds of machines. These compositions comprise a solution of potassium polymethacrylate in a mixture of ethylene glycol, water, and thioethylene diglycol in proportions which ensure a low freezing point and/or good solubility of the polymethacrylate.

Although water or water and ethylene glycol mixtures promote corrosion of metals, have no effective lubricating or anti-wear function, and seep through cracks and clearances with ease, the combination of the materials which make up the compositions of this invention is free from these deleterious properties. The addition of potassium polymethacrylate to water-glycol mixtures provides fluids of suitable consistency for proper retention and operation, but it is necessary to add thioethylene diglycol thereto to secure improvements in other respects. In particular, the films which form by evaporation of water and ethylene glycol tend to be hard and, therefore, objectionable in the absence of thiodiglycol. It has been found that the addition of five or more parts of thioethylene diglycol to 95 parts of a water-ethylene glycol solution effectively overcomes the objectionable features thereof; and, when potassium polymethacrylate is added to this mixture, there is provided a composition with surprisingly good properties.

It has been found that suitable liquid vehicles are obtained with 10 to 55 parts (by weight) of ethylene glycol, 35 to 45 parts of water, and 5 to 45 parts of the thiodiglycol, $HOC_2H_4SC_2H_4OH$, the parts being selected to make 100 parts. To this solvent combination is added from 0.5% to 10% of a potassium polymethacrylate, the amount used depending upon the size of polymer and the desired consistency of the resulting solution.

The size of the polymer may be defined in terms of the viscosity of a solution thereof in water at a fixed concentration, such as 10%. It has been found that a particularly useful polymer size is at hand when a 10% aqueous solution thereof has a viscosity at 100° F. of 10 to 15 centistokes. The polymer is useful, however, when it is only large enough to give a viscosity of five centistokes under the prescribed conditions. On the other hand, polymers sufficiently large to give a viscosity of 100 centistokes may be used where there is no severe shear encountered in the use of the fluid. With high polymers (50 to 100 cs.) there need be present only 0.5% to 1% to give a useful consistency to the fluid. With polymers of lower molecular weight, larger proportions of potassium polymethacrylate are generally used. In the range of polymer sizes giving viscosities of 10 to 20 cs. at 100° F. for 10% solutions in water there may desirably be used amounts giving solutions containing 5% to 3% of the polymer.

Beside imparting body to the fluid, the potassium polymethacrylate adds lubricating action and load-carrying properties, may lower the freezing point of the compositions, and provides favorable relationships for temperature and viscosity of the fluid. As far as thickening action or bodying is concerned, it is possible to increase viscosity by use of other soluble polymeric materials. Although these do not provide the other actions and properties which are needed and which are provided by potassium polymethacrylate, some of them may be used to supplement the bodying caused by potassium polymethacrylate. Thus, for example, polyvinyl alcohol is soluble in glycol-water systems and may be used in conjunction with potassium polymethacrylate, although alone it is not a satisfactory agent.

Commercial ethylene glycol has been found satisfactory for the preparation of the hydraulic fluids here disclosed. There may, if desired, be used ethylene glycol or ethylene glycol-water solutions which have been freed from all traces of acid or potentially acidic substances by such a conventional method as treatment with an anion-exchange resin in its basic form.

When it is required that fluids be provided which do not freeze above −40° F., the liquid components should be selected within the proportions of 40 to 55 parts of ethylene glycol, 35 to 45 parts of water, and 5 to 15 parts of thiodiglycol, the parts being taken to make 100 parts in total.

The following examples provide illustrations of various compositions which have a suitable balance of properties for use as hydraulic fluids.

Example 1

A mixture was prepared from 50 parts of ethylene glycol, 45 parts of water, and 5 parts of ethylene thiodiglycol. Therein was dissolved five parts of a potassium polymethacrylate giving a viscosity of 10 cs. at 100° F. at a concentration of 10% in water. The resulting solution had viscosities as follows: At 210° F., 3.86 cs.; at 100° F., 13.82 cs.; at 0° F., 145.4 cs.; and at −40° F., 913.6 cs. In a seizure test in a Falex tester the fluid supported the full load possible in this machine, 4500 lbs. The hydrocarbon fluids now available for use at low temperatures will not support a load of 400 lbs. without seizure. For an eight-hour period, wear was observed by the Falex method. At a 100 lb. load in this testing machine, wear was at the rate of 7.4 teeth per hour; at 400 lbs. at the rate of 32.2 teeth per hour; and at 800 lbs. at the rate of 288 teeth per hour. The composition was non-flammable and entirely stable on storage.

Example 2

A mixture of 45 parts of ethylene glycol, 45 parts of water, and 10 parts of thiodiglycol was prepared. From this mixture there was prepared a 7.5% solution of a potassium polymethacrylate giving a viscosity of 5 cs. in a 10% solution by the test described above. Viscosities of the hydraulic fluid were determined as follows: At 210° F., 3.215 cs.; at 100° F., 12.51 cs.; at 0° F., 126.4 cs.; and at −40° F., 750.8 cs. Seizure was obtained at a load of 4050 lbs. The composition was not combustible.

Example 3

A mixture of 40 parts of ethylene glycol, 45 parts of water, and 15 parts of thiodiglycol was prepared and used for the preparation of a 5% solution of potassium polymethacrylate therein. This solution was found to have the following viscosities: At 210° F., 3.527 cs.; at 100° F., 12.60 cs.; at 0° F., 132.0 cs.; and at −40° F., 872.0 cs. The viscosity index is calculated as 181. The solution supported a load of over 4300 lbs., did not freeze until well below −40° F., and was stable during storage for three months and used in a hydraulic mechanism.

Example 4

A mixture of 50 parts of ethylene glycol, 45 parts of water, and five parts of thiodiglycol was made and used for the preparation of a 0.7% solution of a potassium polymethacrylate which gave a viscosity at 10% in water of about 90 cs. The resulting fluid gave the following viscosities: At 210° F., 4.37 cs.; at 100° F., 16.88 cs.; at 0° F., 162.5 cs.; and at −40° F., 895 cs. The viscosity index is calculated as 187.6. The solution supported a 4500 lb. load in the Falex tester. Wear was at the rate of 8.5 teeth per hour under a 100 lb. load.

Example 5

A mixture of 10 parts of ethylene glycol, 45 parts of water, and 45 parts of thiodiglycol was prepared and used for the preparation of a 5% solution of potassium polymethacrylate. This solution gave the following viscosities: At 210° F., 2.083 cs.; at 100° F., 6.374 cs.; and at 0° F., 53.1 cs. The solution became frozen at −40° F. This solution contained the minimum amount of ethylene glycol to give full solubility for the polymer at low temperatures.

Example 6

A mixture was prepared from 50 parts by weight of ethylene glycol, 45 parts of water, and 5 parts of thioethylene diglycol. This mixture was used as the solvent base for preparing a hydraulic fluid containing 3.1% of potassium polymethacrylate and 0.9% of polyvinyl alcohol. The resulting fluid had the following viscosities: At 210° F., 4.424 cs.; at 130° F., 10.9 cs.; at 100° F., 17.47 cs.; at 0° F., 186.1 cs.; and at −40° F., 1042 cs. The viscosity index is 183.4. Wear in a Falex tester at 100 lb. load was at the rate of 12.8 teeth per hour. The fluid was not inflammable. The freezing point was about −58° F.

Another fluid was prepared with the same solvent mixture and contained 1.9% of potassium polymethacrylate and 2.3% of polyvinyl alcohol. The viscosities found for this fluid were: At 210° F., 3.772 cs.; at 130° F., 9.6 cs.; at 100° F., 15.94 cs.; at 0° F., 172.1 cs.; and at −40° F., 952.4 cs. The viscosity index is 147.3. The freezing point was found to be −50° F.

In the same way other compositions may be prepared from ethylene glycol, water, thiodiglycol, and potassium polymethacrylate within the range set out above. These compositions have consistencies which permit them to operate mechanisms without excess seepage. If the fluid evaporates, there remains a soft deposit, the thioethylene diglycol acting as a tackifying agent which prevents a hard film from being formed. The compositions have some lubricating action and, while some wear occurs with them, they support a considerable load without seizure. Freezing points are fairly low with boiling points being sufficiently high for the conditions in which a fluid of this type finds application. They have highly favorable viscosity-temperature behavior. The fluids are not inflammable. They are not corrosive to metals, nor do they attack the usual rubber or plastic parts which are found in hydraulic systems.

The compositions based on potassium polymethacrylate, thioethylene diglycol, glycol, and water may contain minor proportions of additives to impart special properties or to meet the particular conditions of a given application. For example, a miscible liquid of high boiling point may be added as an anti-tack agent to supplement the action of the thioethylene diglycol in this respect, glycerine, polyethylene glycols, and ethers of polyethylene glycols being specific illustrations of such agents. A vapor phase corrosion inhibitor may be used, such as isopropylamine nitrite. There may be used to supplement the action of the thioglycol in respect to protection against liquid phase corrosion metal deactivators or agents effective in protecting specific metals, such as dichromates for magnesium and aluminum or sodium mercaptobenzothiazole for copper. There may also be added small amounts of buffers to hold the pH of the fluid at desired levels, such as 7 to 7.5, or of crystallization inhibitors, such as sorbitol, mannitol, or dextrose, or of anti-wear agents such as salts of thioacids or chloroacids or potassium alkyl phosphates, or oxidation inhibitors or stabilizers, and the like.

We claim:

1. A hydraulic fluid consisting essentially of 0.5% to 10% by weight of potassium polymethacrylate dissolved in a solvent medium of 10 to 55 parts of ethylene glycol, 35 to 45 parts of water, and 5 to 45 parts of thioethylene diglycol, the parts being by weight and selected to make 100 parts of said medium.

2. A hydraulic fluid consisting essentially of 0.5% to 10% by weight of potassium polymethacrylate dissolved in a solvent medium of 40 to 55 parts of ethylene glycol, 35 to 45 parts of water, and 5 to 15 parts of thioethylene diglycol, the parts being by weight and selected to make 100 parts of said medium.

3. A hydraulic fluid consisting essentially of 3% to 5% by weight of a potassium polymethacrylate, a 10% solution of which in water has a viscosity of 10 to 20 centistokes at 100° F., dissolved in a solvent medium of 40 to 55 parts of ethylene glycol, 35 to 45 parts of water, and 5 to 15 parts of thioethylene diglycol, the parts being by weight and selected to make 100 parts of said medium.

FRANK J. GLAVIS.
HARRY T. NEHER.

No references cited.